United States Patent [19]
Wartluft et al.

[11] Patent Number: 5,692,785
[45] Date of Patent: Dec. 2, 1997

[54] PLASTIC PIPE COUPLER WITH INTERNAL SEALER

[75] Inventors: Donald W. Wartluft, Broken Arrow; Timothy F. Wood, Owasso, both of Okla.

[73] Assignee: Continental Industries, Inc., Tulsa, Okla.

[21] Appl. No.: 626,024

[22] Filed: Apr. 1, 1996

Related U.S. Application Data

[60] Provisional application No. 60/007,695, Nov. 29, 1995.

[51] Int. Cl.⁶ .................................................. F16L 25/00
[52] U.S. Cl. ...................... 285/328; 285/105; 285/179; 285/323; 285/351; 285/371
[58] Field of Search ............................ 285/371, 323, 285/322, 342, 328, 179, 105, 351

[56] References Cited

U.S. PATENT DOCUMENTS

| | | | |
|---|---|---|---|
| Re. 33,946 | 6/1992 | Corzine | 285/45 |
| 4,083,583 | 4/1978 | Volgstadt et al. | 285/55 |
| 4,229,025 | 10/1980 | Volgstadt et al. | 285/105 |
| 4,282,175 | 8/1981 | Volgstadt et al. | 264/248 |
| 4,407,526 | 10/1983 | Cicenas | 285/27 |
| 4,507,842 | 4/1985 | Werner | 285/371 X |
| 4,519,637 | 5/1985 | Folkers | 285/371 X |
| 4,628,965 | 12/1986 | Passerell | 138/89 |
| 4,632,434 | 12/1986 | Proctor et al. | 285/39 |
| 4,712,813 | 12/1987 | Passerell et al. | 285/250 |
| 4,844,516 | 7/1989 | Baker | 285/371 X |
| 4,991,882 | 2/1991 | Gahwiler | 285/331 |
| 5,094,494 | 3/1992 | McConnell | 285/318 |
| 5,150,924 | 9/1992 | Yokomatsu et al. | 285/323 X |
| 5,172,943 | 12/1992 | Shimada | 285/323 |
| 5,366,260 | 11/1994 | Wartluft | 285/323 |
| 5,378,023 | 1/1995 | Olbrich | 285/24 |
| 5,411,297 | 5/1995 | Brown | 285/62 |
| 5,524,940 | 6/1996 | Wartluft | 285/371 X |

FOREIGN PATENT DOCUMENTS

| 1159258 | 6/1958 | France | 285/371 |
|---|---|---|---|

*Primary Examiner*—Dave W. Arola
*Attorney, Agent, or Firm*—Head, Johnson & Kachigian

[57] ABSTRACT

A coupling for securing a plastic pipe. The coupling has a rigid hollow coupling shell with a passageway through it. A rigid stiffener tube is positioned internally of the shell, the stiffener tube having an external diameter slightly less than the internal diameter of the pipe. The stiffener tube has an external circumferential groove spaced from its outer end. A toroidal elastomeric seal is positioned within the stiffener tube circumferential groove. When a pipe end portion is inserted into the coupler shell, the stiffener tube extends telescopically within the interior of the pipe end portion and the seal engages the interior of the pipe to seal the interior of the pipe to the interior of the stiffener tube. A rigid gripper positioned within the coupler shell engages the exterior surface of the pipe and prevents the pipe from being extracted from the coupler shell.

6 Claims, 3 Drawing Sheets

PLASTIC PIPE COUPLER WITH INTERNAL SEALER

CROSS-REFERENCE TO RELATED APPLICATIONS

This application is based on provisional application Ser. No. 60/007695 entitled "PLASTIC PIPE COUPLER WITH INTERNAL SEALER", filed Nov. 29, 1995.

CROSS-REFERENCE TO MICROFICHE APPENDIX

This application is not related to any microfiche appendix.

BACKGROUND OF THE INVENTION

1. Field of the Invention. The present invention relates to a stab-type coupler designed to couple a plastic pipe to a coupler fitting. In one embodiment, the coupler is configured to receive the end portion of a first plastic pipe and concentrically the end portion of a second plastic pipe so that the coupler functions to connect the two pipes together in an end-to-end relationship. In another embodiment, the coupler is in the form of a "L" fitting so that two lengths of pipe can be connected in an "L" connection. However, the pipe coupler may be employed as a portion of any other type of fitting wherein one end of a length of pipe is inserted into the coupler and is thereafter retained by the coupler, the coupler providing a sealed connection with the internal surface of the pipe.

2. Description of Related Art. The present invention is generally referred to in the industry as a "stab-type" coupler, that is, the coupler of this disclosure is designed to be inserted manually onto the end of a length of plastic pipe. By mechanisms within the coupler, the extraction of the coupler thereafter from the end of the pipe cannot be accomplished without destroying either a portion of the coupler or a portion of the pipe. Further, the stab-type connector serves to form a sealed, leak proof communication with another fluid handling object, such as another length of pipe.

In the past, stab-type connectors have concentrated upon obtaining a leak proof seal between a coupler and the exterior surface of a plastic pipe. In contrast, the present disclosure provides a means of obtaining a leak proof connection with the interior surface of a plastic pipe. In a more particular embodiment, the coupler of this disclosure has means for attaining leak proof contact with both the interior and exterior surface of a plastic pipe.

Many of the basic elements of the plastic pipe coupler with internal sealer of this disclosure are illustrated and described in U.S. Pat. No. 5,366,260 issued Nov. 22, 1994 and entitled "Plastic Pipe Coupler". The present disclosure is differentiated from the plastic pipe coupler in U.S. Pat. No. 5,366,260 primarily by the fact that the present disclosure teaches a method of attaining improved sealing effectiveness in an arrangement wherein sealing is accomplished on the interior of the plastic pipe being coupled and, in a preferred embodiment, simultaneously both on the interior and exterior surface of the plastic pipe being coupled. For additional background information as to plastic pipe couplers, reference may be had to the following previously issued United States patents:

| PATENT NO. | INVENTOR | TITLE |
|---|---|---|
| Re. 33946 | Corzine | Axially Split Clamp For Push-On Couplings |
| 4083583 | Volgstadt et al | Pipe Fitting Having A Non-Metallic Sealing Member |
| 4229025 | Volgstadt et al | Stab-Type Coupling |
| 4282175 | Volgstadt et al | Stab-Type Coupling and Method |
| 4407526 | Cicenas | Stab-Type Coupling and Method |
| 4628965 | Passerell | Stab-Type Coupling |
| 4632434 | Proctor et al | Coupling Means For Tubular Members |
| 4712813 | Passerell et al | Coupling Apparatus |
| 4991882 | Gahwiler | Fluid-Tight Connector |
| 5094494 | McConnell | Spring Lock Coupling |
| 5366260 | Wartluft | Plastic Pipe Coupler |
| 5378023 | Olbrich | Pipe Connection, Particularly On Composite Pipes |
| 5411297 | Brown | Conduit Mounting System |

SUMMARY OF THE INVENTION

A coupler is provided for attachment to a plastic pipe of the type having substantially uniform internal and external surfaces. The coupling is formed of a hollow rigid coupling shell having opposed first and second ends. A passageway extends through the coupling shell. The passageway is defined by a larger internal diameter portion adjacent the first end and a smaller internal diameter portion adjacent the second end. An internal frusto-conical surface tapering towards the second end is provided on the interior surface of the hollow rigid coupling shell.

A rigid stiffener tube that may be of metal or strong plastic is positioned within the coupling shell. The stiffener tube is of an external diameter slightly less than the internal diameter of the pipe to be secured to the coupler. Formed on the exterior surface of the stiffener tube adjacent an outer end thereof is an external circumferential groove. Positioned within the interior of the coupling shell is a rigid hollow gripper having a frusto-conical external surface that is in a slidable engagement with the coupler shell internal frusto-conical surface. The gripper is slidably received on the exterior surface of a pipe as the pipe is inserted into the coupler and has internal ridges thereon that bite into the external surface of a plastic pipe to thereby prevent, after insertion, the pipe from being extracted from the coupler.

A toroidal elastomeric seal, such as an O-ring, is positioned within the circumferential groove on the stiffener tube. The elastomeric seal engages the internal surface of a pipe secured within the coupler to thereby seal the interior of the pipe to the interior of the stiffener tube.

In one embodiment of the invention, two coupler shells are positioned end-to-end and secured within an exterior outer protective body, forming a coupling that will connect two lengths of pipe in concentric end-to-end relationship. In another embodiment, coupler shells are supported adjacent a coupler body and are contained within an outer protective body with the passageways through the coupler shell arranged perpendicular to each other. A fitting of this type provides an L-shaped connection for connecting two lengths of pipe at right angles to each other. The coupler of this invention can be formed as a portion of any other object wherein it is a desire to connect a length of plastic pipe to the object by means of a stab-type fitting that requires no tools for installation.

An important feature of the invention is that plastic pipe is coupled in a stab fitting providing for sealing internally of the pipe. In a preferred arrangement, sealing is obtained internally and externally of the pipe. The exterior surface of plastic pipe can be easily damaged. That is, it can be scratched or abraded and such defects on the external surface can sometimes make it difficult to secure a leak proof seal with the external surface. The chance of damage to the interior surface of a plastic pipe is substantially less. Therefore, by sealing on the interior surface the effectiveness of stab-type connectors is substantially improved. In addition, by sealing both interiorly and exteriorly of a plastic pipe, the overall sealing effectiveness of a coupling is significantly enhanced.

For a better understanding of the invention, reference should be had to the following description of the invention and the claims, taken in conjunction with the attached drawings.

DESCRIPTION OF THE INVENTION

Figure 1:
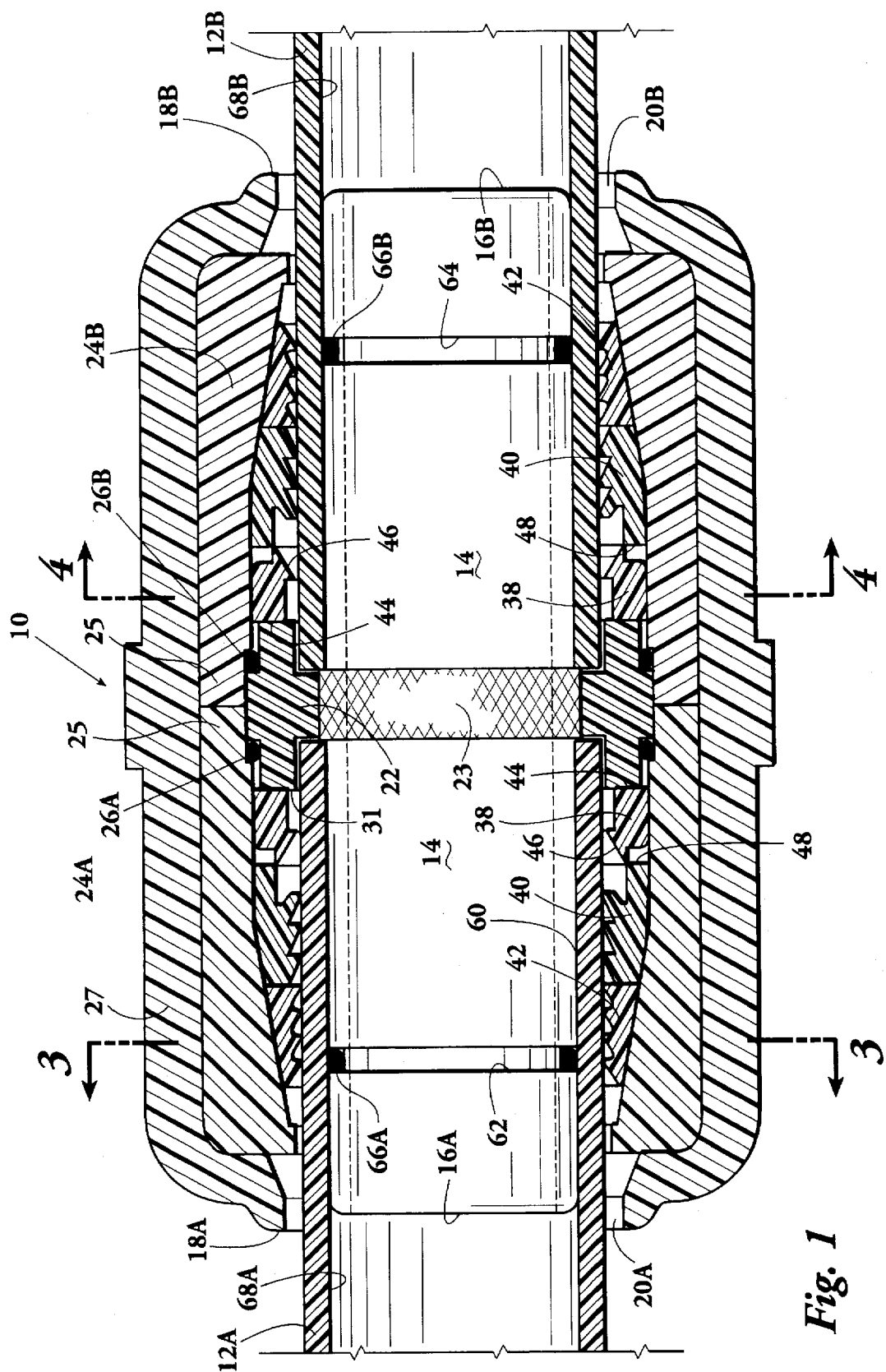
FIG. 1 is a cross-sectional elevational view of a plastic pipe coupler constructed according to a preferred embodiment of the present invention.

Referring now to the drawings and initially to FIGS. 1 through 4, there is illustrated a coupler 10 for use in securing together two lengths of plastic pipes 12A and 12B. A straight tubular stiffener 14 extends through the coupler. The stiffener is preferably constructed of rigid material, such as plastic or metal, and has ends 16A and 16B that are adjacent coupler ends 18A and 18B.

Stiffener 14 has an external diameter slightly smaller than the internal diameter of pipes 12A and 12B in order to permit the pipes to be pushed onto the stiffener. As pipes 12A and 12B are pushed onto stiffener 14, they enter the coupler 10 via openings 20A and 20B provided respectively in the ends 18A and 18B.

Stiffener 14 is secured within coupler 10 by means of a hub 22 that encircles the stiffener approximately midway between ends 16A and 16B. A knurled area 23 is formed on stiffener 14 intermediate ends 16A and 16B. Knurled area 23 helps maintain hub 22 in position on stiffener 14, or hub 22 may be bonded to stiffener 14 at knurled area 23.

Hub 22 is secured within coupler 10 between two hollow inner shell halves 24A and 24B. Each of the shell halves 24A and 24B has an inner end 25 of enlarged internal diameter so that the inner ends 25 of shell halves 24A and 24B receive and secure the hub 22 between the shell halves 24A and 24B. Positioned on both sides of an integral intermediate enlarged external diameter portion of hub 22 are O-rings 26A and 26B that seal hub 22 to the interior of shell halves 24A and 24B.

A protective outer body 27 surrounds shell halves 24A and 24B and serves to hold the shell halves in position around hub 22. Hub 22, inner shell halves 24A and 24B, and outer protective body 27 are all preferably constructed of rigid material, such as tough plastic.

Figure 2:
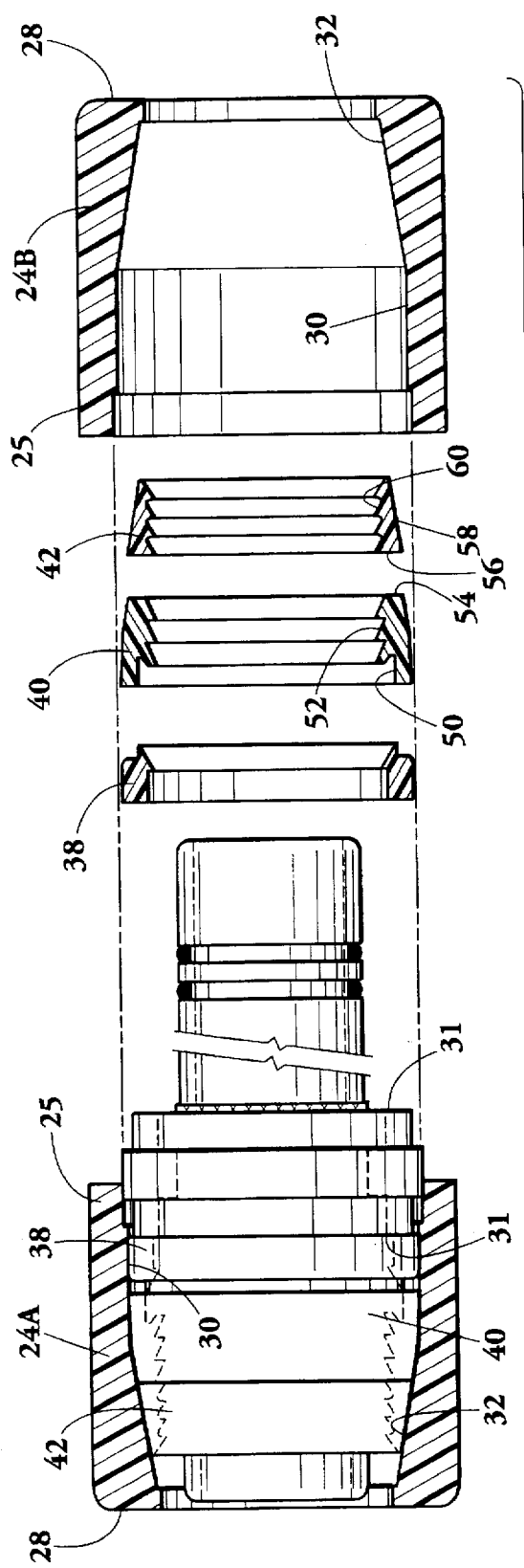
FIG. 2 is a partially exploded cross-sectional view of the plastic pipe coupler of FIG. 1 with the outer body removed.

Referring now to FIG. 2, each of the shell halves 24A and 24B has an outer end 28 opposite inner end 25. Adjacent inner end 25, the hollow interior of each shell has an internal straight portion 30 with a uniform internal diameter. Opposed annular surfaces of hub 22 form innermost vertical walls 31. Adjacent to the straight portion 30 each shell half 24A and 24B has an internal frusto-conical surface 32. Each frusto-conical surface 32 progressively decreases in internal diameter in the direction away from straight portion 30 and towards outer ends 28 of each shell half 24A and 24B.

Adjacent to hub 22 and enclosed within the straight portions 30 of each shell half 24A and 24B is a toroidal follower 38. Adjacent follower 38 and enclosed within the straight portions 30 of each shell half is a toroidal front boot seal 40. Adjacent front boot seal 40 and enclosed within each of the straight portion 30 of each shell half is a hollow gripper 42.

Each front boot seal 40 is preferably formed of a compressible material, such as rubber. As shown in FIG. 1, each follower 38 is provided with an inner side 44 that abuts hub 22 and an outer side 46 that meshes with the inner end 48 of front boot seal 40.

A hollow interior surface 50 in the front boot seal 40 is provided with a plurality of sawtoothed-shaped flexible ridges or serrations 52 that flex to allow pipes 12A and 12B to be inserted into coupler 10. Once a pipe has been inserted into coupler 10 serrations 52 flex back against the pipe, forming multiple ring seals around the exterior of the pipe. Serrations 52 are backwardly oriented so that they are forced into a tighter sealing engagement when pulling force is exerted on the pipe. In addition, when high internal fluid pressures are experienced, serrations 52 are forced into tighter sealing engagement with the pipe.

Front boot seal 40 has an outer end that engages the forward face 56 of gripper 42.

External surfaces 58 provided on each of the grippers 42 are generally frusto-conical to coincide in shape and slope with internal surface 32 of inner shell halves 24A and 24B. Grippers 42 are preferably constructed of rigid material, such as hard plastic.

Similar to front boot seal 40, each of grippers 42 is provided with a hollow interior surface having a plurality of sawtooth-shaped ridges or gripper serrations 60. However, unlike the serrations 52 found on front boot seal 40, gripper serrations 60 are not flexible.

Once pipes 12A and 12B have been fully inserted into coupler 10, pipes 12 are held in place by backwardly oriented gripper serrations 60 which bite into the exterior surfaces of the pipes. Pulling force causes grippers 42 to be pulled slightly outwardly, causing their exterior surfaces 58 to travel outwardly within the shell halves frusto-conical surfaces 32 causing gripper serrations 66 to more tightly bite into the pipes.

An important improvement of the coupler of this invention is a means of internally sealing plastic pipes 12A and 12B. Formed onto the exterior surface of stiffener 14 adjacent end 16A is a circumferential groove 62. In like manner, adjacent stiffener end 16B is a circumferential groove 64. Positioned in the grooves are O-rings 66A and 66B that sealably contact the internal surfaces 68A and 68B of plastic pipes 12A and 12B respectively.

The previously known typical plastic pipe coupling of the mechanical type depends upon sealing engagement of elastomeric material with a pipe external surface. The external surface of plastic pipe is frequently marred by contact with physical objects during handling of the pipe, cutting of the pipe to length and fitting it in position. A scratch, dent, or the presence of dirt or other foreign material on the surface of a pipe can result in leakage when a mechanical coupling is employed. However, it has been observed that the interior surface of plastic pipe is less frequently damaged and therefore is more ideally suited to receive sealing contact with a sealed member. Therefore, the sealing arrangement as illustrated in FIGS. 1 through 4 is more likely to succeed in obtaining a leak proof seal.

Figure 4:
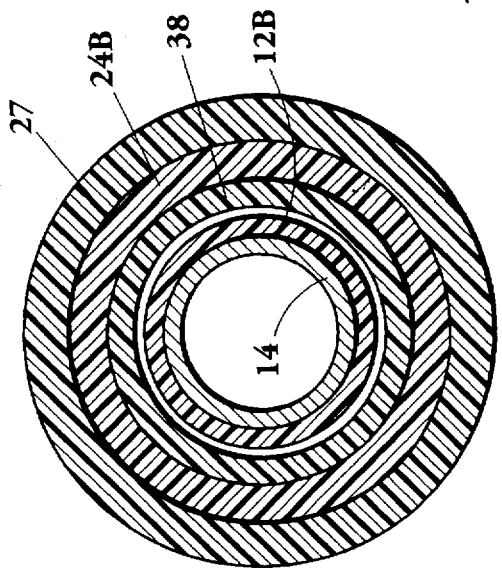
FIG. 4 is a cross-sectional view taken along the lines 4—4 of FIG. 1.
Figure 3:
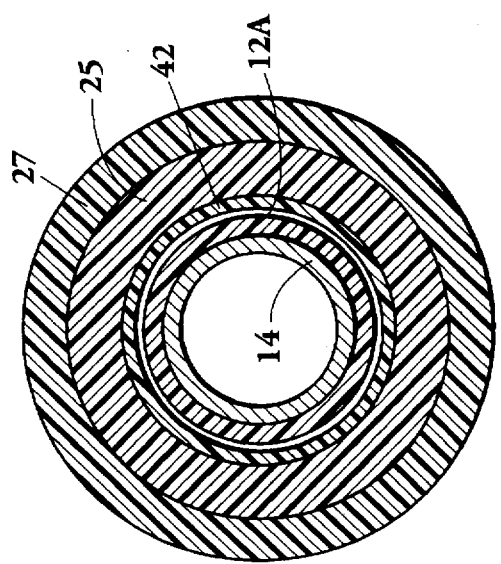
FIG. 3 is a cross-sectional view taken along the lines 3—3 of FIG. 1.

FIG. 3 and 4 show cross-sectional views of the coupler of FIGS. 1 and 2.

Figure 5:
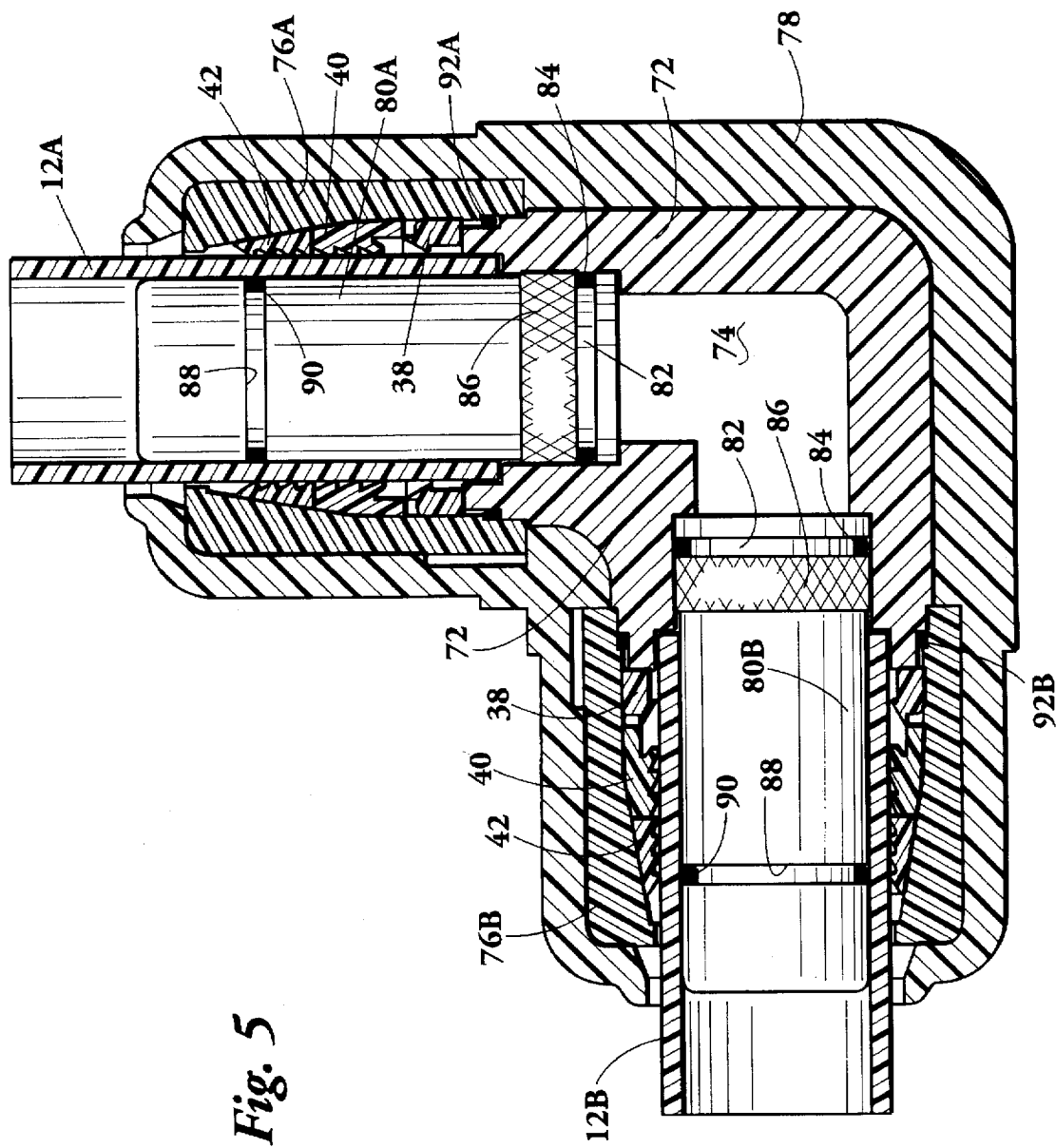
FIG. 5 is a cross-sectional view of an L-shaped coupling employing the principals of this invention to connect two lengths of pipe at a right angle.

FIG. 5 shows an alternate embodiment of the invention wherein the coupling is in the form of an "L" and where like numbered components have like functions as described with reference to FIGS. 1 through 4. The main structure or body 72 has a fluid passageway 74 therethrough.

Positioned at the ends of body 72 are shells 76A and 76B that correspond and function like shell 24A and 24B of FIGS. 1 through 4. Retained within shells 76A and 76B are followers 38, front boot seals 40 and grippers 42 all have the function as previously described.

Outer protective body 78 is molded of stiff plastic around the assembled internal components.

Extending from a first end of body 72 is a first stiffener 80A and from the second end of body 72 is a second stiffener 80B. Near the inner end of each of the stiffeners is a groove 82 that receives an O-ring 84. Each of the stiffeners includes a knurled portion 86 to assist in retaining the stiffeners in connection with coupler body 72 or the knurled portions may assist in bonding the stiffeners to the body.

Each stiffener has, adjacent its outer end, a circumferential exterior groove 88, each of the grooves receiving an O-ring 90. Positioned within one end of the L-shaped coupling is a first plastic pipe 12A and in the other end of the coupling a second plastic pipe 12B. Plastic pipes 12A and 12B are retained within the coupling by grippers 42, as previously described, with external sealing provided by followers 38 and front boot seals 40 as has been described with reference to FIGS. 1 through 4. An important feature of the L-shaped fitting of FIG. 5 is the provision of O-rings 90 on stiffeners 80A and 80B that seal the stiffeners to the interior of pipes 12A and 12B. As previously stated, sealing by engagement of O-rings with the internal surfaces of pipes has increased effectiveness since the internal surfaces are less likely to be scratched or otherwise marred in handling of the pipes.

Positioned about a first end of body 72 is an O-ring 92A and in like manner, positioned about the opposite end of body 72 is an O-ring 92B. O-rings 92A and 92B help maintain a leak proof relationship between body 72 and shells 76A and 76B.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A coupling for securing a plastic pipe, the pipe having internal and external surfaces having substantially uniform internal and external diameters, the coupling comprising:

a hollow rigid coupling shell having opposed first and second ends and a passageway extending therethrough, the passageway being defined by a larger internal diameter portion adjacent said first end and a smaller internal diameter portion adjacent said second end and an internal frusto-conical surface tapering inwardly towards said second end;

a rigid stiffener tube in a fixed position within said shell, the stiffener having an outer end, having an external diameter slightly less than the internal diameter of a pipe to be secured by the coupler and having an external circumferential groove therein spaced from said outer end;

means to support said stiffener tube within said shell;

a rigid, hollow gripper having a radius, said gripper positioned within said shell having an internal circumferential surface configured to grippingly engage a pipe secured by the coupler after axial insertion of said pipe; and a toroidal elastomeric seal received in said stiffener tube circumferential groove configured to engage the internal surface of a pipe secured by the coupler, said tube external groove and said elastomeric seal having a radius which is aligned both axially and radially with said hollow gripper radius.

2. A coupling for securing a plastic pipe according to claim 1 including:

at least one flexible hollow seal positioned within said shell having an internal circumferential surface configured to sealably engage the exterior surface of a pipe secured by the coupler.

3. A coupling for securing a plastic pipe according to claim 1 including:

an outer protective body surrounding said shell.

4. A coupling for securing a plastic pipe according to claim 1 including a second hollow rigid coupling shell configured as said first mentioned coupling shell having a first end and where the second coupling shell is supported in alignment with said first mentioned coupling shell second end, the coupling shells being in coaxial alignment and wherein said stiffener tube extends into both said first mentioned and said second mentioned coupling shell and wherein said stiffener tube has opposed outer ends and has an external circumferential grooves thereon spaced from each of said outer ends, and including first and second grippers each having a configuration substantially the same as said first mentioned gripper and positioned within said second coupling shell, and a toroidal elastomeric seal received in each said stiffener circumferential groove and configured to engage the internal surfaces of first and second pipes secured in axial alignment by the coupler.

5. A coupling according to claim 1 including:

a coupler body having a passageway therethrough and having a portion having an end with a recess therein of internal diameter slightly greater than the external diameter of said stiffener tube, the coupler body portion being in axial alignment with said coupling shell, and wherein said stiffener tube has a second outer end and has a second external circumferential groove therein adjacent said second outer end and including a second toroidal elastomeric seal received in said stiffener second circumferential groove configured to engage said recess in said coupler body.

6. A coupling for securing the end portions each of first and second plastic pipes comprising:

a first and second coupler shell each having a cylindrical passageway therethrough dimensioned to receive an end portion of a plastic pipe;

a coupler body having cylindrical recesses in the opposed ends thereof, each recess being in axial alignment with said coupler shell passageway, the coupler body recesses being slightly greater in internal diameter than the external diameter of said plastic pipe end portions;

first and second rigid stiffener tubes, each having first and second end portions, said first stiffener tube being in a fixed position within said first coupler shell and said first end portion thereof within one of said coupler body recesses and said second stiffener tube being in a fixed position within said second coupler shell and said first end portion thereof within the other said coupler body recess, said stiffener tubes each having external circumferential grooves thereon adjacent each of said first and second end portions;

an elastomeric seal received within each of said grooves on each of said first and second stiffener tubes for engagement with said coupler body recesses and with the internal surface of the end portions of first and second plastic pipe positioned within said first and second coupler shells respectively; and means within said first and second coupler shells to retain said end portions of the first and second plastic pipes from extraction after the end portions of the first and second plastic pipes are axially inserted within said coupler shells, said means including a first and second rigid hollow gripper, each said gripper having a radius, said first gripper radius aligned radially and axially with said first tube seal and said second gripper radius aligned radially and axially with said second tube seal.

* * * * *